United States Patent
Brenner

(10) Patent No.: US 6,809,684 B2
(45) Date of Patent: Oct. 26, 2004

(54) SIGNAL DEFORMATION MONITOR

(75) Inventor: Mats A. Brenner, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/667,854

(22) Filed: Sep. 22, 2003

(65) Prior Publication Data

US 2004/0189518 A1 Sep. 30, 2004

Related U.S. Application Data

(60) Provisional application No. 60/413,252, filed on Sep. 24, 2002, provisional application No. 60/413,080, filed on Sep. 24, 2002, provisional application No. 60/413,211, filed on Sep. 24, 2002, and provisional application No. 60/413,251, filed on Sep. 24, 2002.

(51) Int. Cl.[7] .............................................. G01S 5/14
(52) U.S. Cl. ................................ 342/358; 342/357.03
(58) Field of Search ............................ 342/358, 357.03

(56) References Cited

U.S. PATENT DOCUMENTS

| | | | | |
|---|---|---|---|---|
| 5,610,616 A | * | 3/1997 | Vallot et al. | 342/357.03 |
| 5,926,132 A | * | 7/1999 | Brenner | 342/357.06 |
| 6,047,017 A | | 4/2000 | Cahn et al. | 375/200 |
| 6,121,923 A | | 9/2000 | King | |
| 6,219,373 B1 | | 4/2001 | Lee et al. | |
| 6,295,024 B1 | | 9/2001 | King et al. | |
| 6,313,789 B1 | | 11/2001 | Zhodzishsky et al. | |
| 6,407,699 B1 | | 6/2002 | Yang | |
| 6,603,803 B1 | * | 8/2003 | Hatch | 342/357.07 |
| 2002/0101912 A1 | * | 8/2002 | Phelts et al. | 375/148 |

FOREIGN PATENT DOCUMENTS

| | | | | |
|---|---|---|---|---|
| WO | WO 00/54448 | 9/2000 | ............ | H04K/1/00 |
| WO | WO 01/39698 A1 | 6/2001 | ............ | A61F/2/06 |
| WO | WO 02/39136 A2 | 5/2002 | | |

OTHER PUBLICATIONS

"Category I Local Area Augmentation System Ground Facility", Specification FAA–E– 2937 A; United States Department of Transportation Federal Aviation Administration, Apr. 17, 2002.
Ward, Phillip, "Effects of RF Interference On GPS Satellite Signal Receiver Tracking," Understanding GPS Principles and Applications, Chapter 6, pp. 209–236, 1996.
Jakab, A., "An Approach to GPS Satellite Failure Detection," NovAtel Inc.
Hartman, Randy, "LAAS Government Industry Partnership (GIP)," Honeywell International Inc.
Hartman, Randy, "Precision Approach Using Differential GPS," Honeywell International Inc.
Ray, J.K., et al., "Characterization of GPS Carrier Phase Multipath," Department of Geomatics Engineering, university of Calgary, Alberta, Canada, ION NTM–99, San Diego, Jan. 25–27, 1999.

(List continued on next page.)

Primary Examiner—Gregory C. Issing
Assistant Examiner—Fred H Mull
(74) Attorney, Agent, or Firm—McDonnell Boehnen Hulbert & Berghoff LLP

(57) ABSTRACT

A signal deformation monitor that corrects for bias caused by receiver front end signal deformation is disclosed. The signal deformation monitor includes a correlator that determines a plurality of correlation measurements along a correlation curve. The correlation measurements are transformed by a correlation transformation. The correlation transformation subtracts the mean of the correlation measurements over all tracked satellites from each of the correlation measurements calculated by the correlator. The transformed correlation measurements are independent of the front end signal deformation, resulting in a deformation monitor that will more accurately detect satellite signal deformation.

13 Claims, 4 Drawing Sheets

OTHER PUBLICATIONS

Maurer, M. et al., "Advanced Receiver Technology For Existing and Future Satellite Navigation Systems," International Journal of Satellite Communications, 2000; 18: pp. 347–364.

Upadhyay, Triveni et al., "Test Results on Mitigation of SATCOM–Induced Interference to GPS Operation," http://www1.faa.gov/and/and300/datalink/dlsys/satcom.htm, printed May 2003.

"About the Radio Frequency Interference Monitoring System (RFIMS)," Institute For Telecommunications Sciences, http//www.its.bldrdoc.gov/home/programs/rfims/rfims.html, printed Feb. 4, 2003.

Legrand, Fabrice et al., "Real–Time Minimization of the Total Tracking Error In Phase and Delay Lock Loops—A Second Approach of the Fast Adaptive Bandwidth Algorithm," http://www.recherche.enac.fr/ltst/papers/ion_am_01.pdf, printed May, 2003.

Saarnisaari, Harri, "Phase Interference Extractor Interference Canceller In DS/SS Code Synchronization," http://www.cwc.oulu.fi/home/projects/AWICS/awics_pub/2000/harri_saarnisaari_euroco00.pdf, printed Mar. 17, 2003.

Landry, Rene Jr. et al., "Analysis of Potential Interference Sources and Assessment of Present Solutions For GPS/GNSS Receivers," 4th Saint–Petersburg on INS, May 26–28, 1997.

Ali–Ahmad, Walid, Ph.D., "RF System Issues Related to CDMA Receiver Specifications," RF Standards, Sep. 1999.

"Adaptive Interference Cancellation : The Latest Weapon Against Interference," http://www.cyberrf.com/appnote/canc/cancAppnote2.htm, printed Feb. 4, 2003, pp. 1–5.

Butsch, Felix, "Innovation: A Growing Concern Radiofrequency Interference and GPS," GPS World, Oct. 2002.

Macabiau, Christophe et al., "Use of MultiCorrelator Techniques For Interference Detection," http://www.recherche.enac.fr/ltst/papers/ion_ntm_2001_interf.pdf, printed Mar. 17, 2003.

Bastide, Frederic et al., "GPS Interference Detection and Identification Using Multicorrelator Receivers," http://www.recherche.enac.fr/ext/ltst/papers/ion_gps_01.pdf, printed on Mar. 10, 2003.

Maenpa, Jon E. et al., "New Interference Rejection Technology From Leica," Leica Geosystems Inc., Sep. 1997.

Ober, P.B. et al., "The Suitability of GPS For Basic Area Navigation," 10th International Technical Meeting of the Satellite Division of the Institute of Navigation, ION GPS–97, Sep. 16–19, 1997.

Volpe, John A., "Vulnerability Assessment of the Transportation Infrastructure Relying On the Global Positioning System," Final Report, U.S. Department of Transportation, Aug. 29, 2001.

Gromov, Konstantin, "GIDL: Generalized Interference Detection and Localization System," Dissertation submitted to the Department of Aeronautics and the Committee on Graduate Studies of Stanford University in partial fulfillment of the requirements for the degree of Doctor of Philosophy, Mar. 2002.

Phlets, Robert Eric, "Multicorrelator Techniques For Robust Mitigation of Threats to GPS Signal Quality," A dissertation submitted to the department of mechanical engineering and the committee of graduate studies of Stanford University of partial fulfillment of the requirements for the degree of Doctor of Philosophy, Jun. 2001.

International Search Report for PCT/US03/29955 Mailed Jan. 26, 2004.

* cited by examiner

SIGNAL DEFORMATION MONITOR

PRIORITY

The present patent application claims priority under 35 U.S.C. §119(e) to the following U.S. Provisional Patent Applications, the full disclosures of which are each incorporated herein by reference:

U.S. Provisional Patent Application Serial No. 60/413,252; filed on Sep. 24, 2002, entitled "Signal Deformation Monitor," to Brenner.

U.S. Provisional Patent Application Serial No. 60/413,080; filed on Sep. 24, 2002, entitled "Radio Frequency Interference Monitor," to Brenner.

U.S. Provisional Patent Application Serial No. 60/413,211; filed on Sep. 24, 2002, entitled "Low Power Detection and Compensation for Satellite Systems," to Brenner.

U.S. Provisional Patent Application Serial No. 60/413,251; filed on Sep. 24, 2002, entitled "Dual Antenna Adaptive Compensation Algorithm," to Brenner et al.

RELATED APPLICATIONS

This application is related to the following concurrently filed U.S. Applications, which are incorporated by reference herein:

U.S. patent application Ser. No. 10/667,830; filed on Sep. 22, 2003, entitled "Radio Frequency Interference Monitor," to Brenner.

U.S. patent application Ser. No. 10/667,628; filed on Sep. 22, 2003, entitled "Low Power Detection and Compensation for Satellite Systems," to Brenner.

U.S. patent application Ser. No. 60/413,251; filed on Sep. 24, 2002, entitled "Dual Antenna Adaptive Compensation Algorithm," to Brenner et al.

FIELD

The present invention relates generally to satellite systems, and more particularly, relates to monitoring satellite signal deformation.

BACKGROUND

Pilots typically use landing navigation systems when they are landing an aircraft. These systems assist the pilot in maintaining the aircraft along a predetermined glide path associated with a particular landing strip or runway. In general, ground-based navigational systems are employed. Two common ground-based navigation systems currently in use are the Instrument Landing System (ILS) and the Microwave Landing System (MLS).

Due to limitations in the ILS and MLS Systems, including cost and single approach limitations, the Federal Aviation Administration (FAA) is transitioning the National Airspace System (NAS) from ground-based navigational systems to satellite-based navigational systems. In this endeavor, the FAA, with assistance from industry, is developing a Local Area Augmentation System (LAAS) to provide a satellite-based landing solution, which is designed to assist the pilot during approach and landing of an aircraft.

The LAAS uses a differential global positioning system (DGPS). The DGPS includes a global positioning system (GPS) and at least one ground station. The GPS uses a number of orbiting satellites and a receiver on an aircraft to determine the position of the aircraft with respect to ground. With the satellite information, the receiver can determine the position, speed, and altitude of the aircraft. By adding a ground station, the DGPS can correct errors that may occur in the transmission of data from the satellites to the receiver. As a result the DGPS can determine the position of the aircraft with a high degree of accuracy.

In 1998, the FAA initiated a program to develop requirements for developing and deploying a LAAS Ground Facility (LGF). The LGF will monitor the satellite constellation, provide the LAAS corrections and integrity data, and provide approach data to and interface with air traffic control. As a result of this program, the FAA released Specification FAA-E-2937A, for a Category I LGF on Apr. 17, 2002, the contents of which are incorporated by reference. This specification establishes the performance requirements for the LGF.

The LGF specification has identified signal deformation as a threat to the LGF that must be handled to ensure accuracy and integrity of the LAAS. Satellite signal deformations that occur in the front end of the receiver (i.e. before digitization in a receiver) typically can be ignored since they are common to all satellites. However, this front end signal deformation may bias correlation measurements used for monitoring signal deformation. Experimental data has shown that there is a variation between individual receivers of the same type and over time due to temperature variations. To avoid having to characterize every individual receiver over the operational temperature range it would be beneficial to have a method of monitoring satellite signal deformation that corrects for bias to the correlation measurements caused by the front end signal deformation.

BRIEF DESCRIPTION OF THE DRAWINGS

Presently preferred embodiments are described below in conjunction with the appended drawing figures, wherein like reference numerals refer to like elements in the various figures, and wherein.

DESCRIPTION

Figure 1:
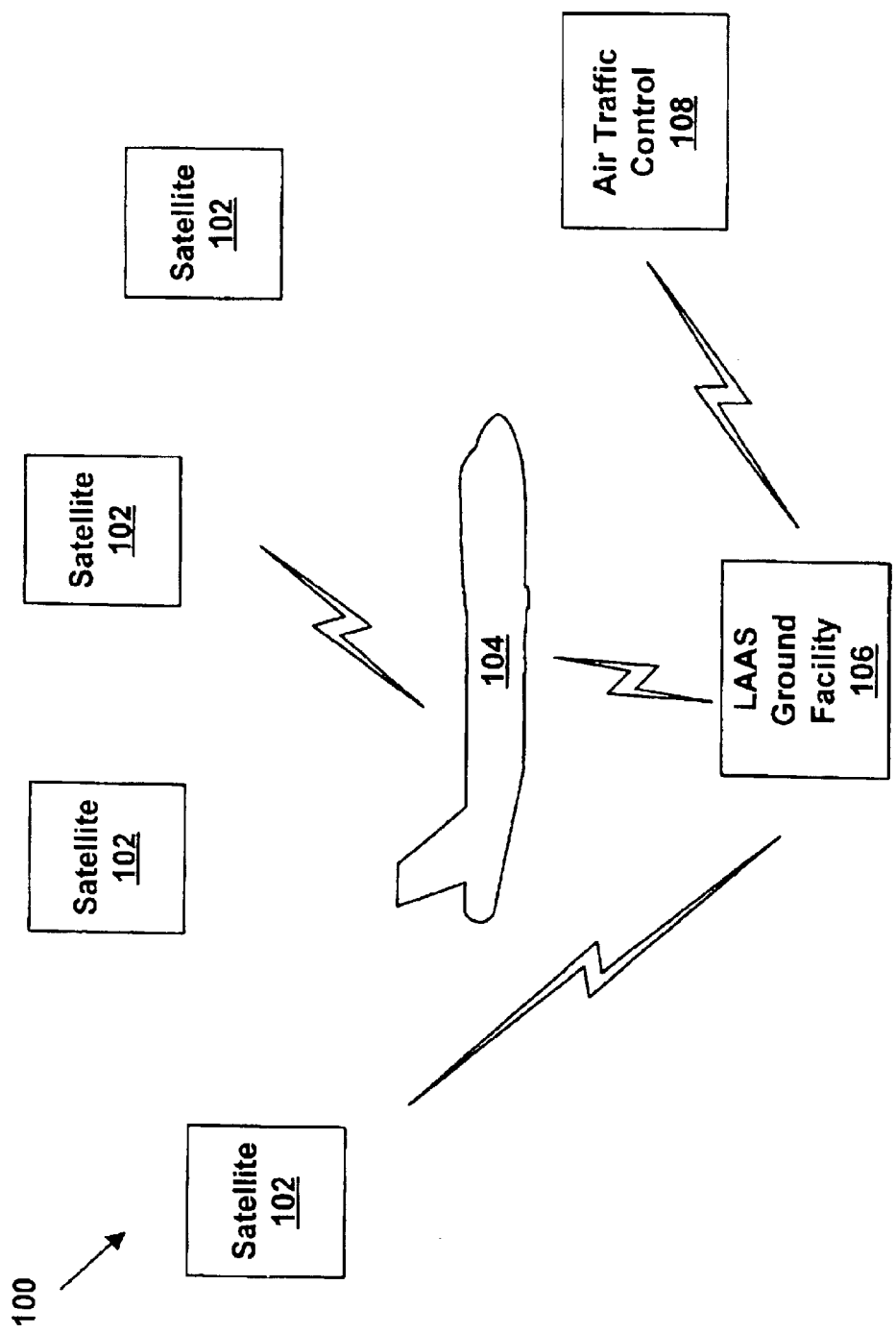
FIG. 1 is a pictorial representation of a Local Area Augmentation System (LAAS), according to an exemplary embodiment.

FIG. 1 is a pictorial representation of a Local Area Augmentation System (LAAS) 100, which augments a differential global positioning satellite (DGPS) system. The LAAS 100 includes a plurality of satellites 102 and a LAAS Ground Facility (LGF) 106 for providing precision approach data and landing capability to an aircraft 104. While FIG. 1 depicts four satellites, the plurality of satellites 102 may include any number of satellites currently orbiting the earth and any new satellites that are installed in the future. The LAAS 100 may also include additional components not depicted in FIG. 1.

The satellites 102 may provide the aircraft 104 and the LGF 106 with GPS ranging signals and orbital parameters. Additionally, the LGF 106 may provide differential corrections, integrity parameters, and precision approach pathpoint data to the aircraft 104. The aircraft 104 may apply the LGF corrections to the GPS ranging signals to accurately determine its position. The aircraft 104 may use an on-board GPS receiver(s) (not shown) to receive the ranging signals and to calculate an estimate of its position. Communication between the LGF and the aircraft 104 may be conducted using Very High Frequency (VHF) Data Broadcast (VDB).

In addition, the LGF 106 may provide status information to air traffic control 108 via an Air Traffic Control Unit (ATCU) (not shown). The ATCU provides air traffic controllers with LGF status information and runway control capabilities. For maintenance purposes, LGF status information may also be available on a Local Status Panel (LSP) (not shown).

Figure 2:
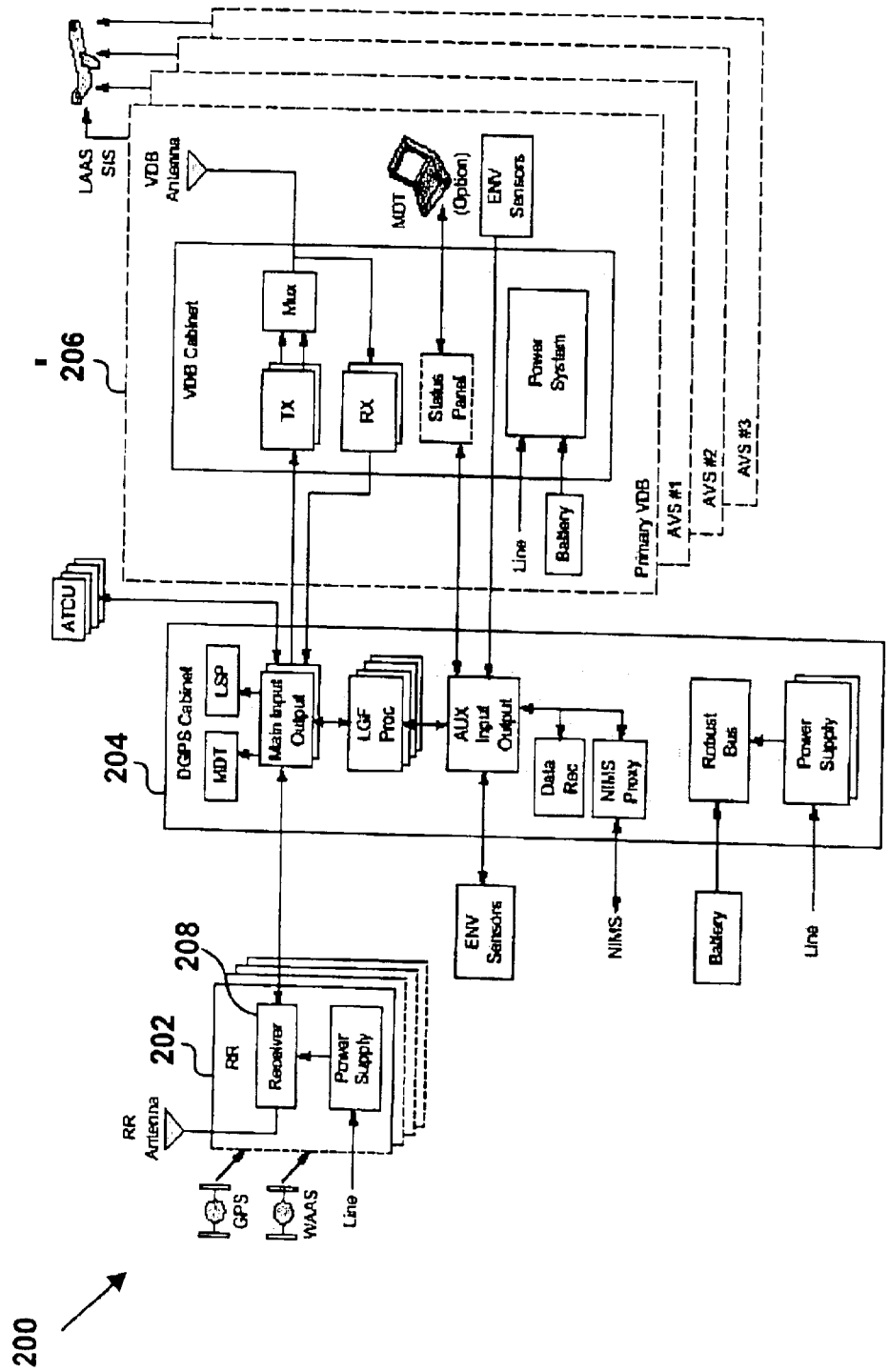
FIG. 2 is a block diagram of a LAAS Ground Facility (LGF), according to an exemplary embodiment.

FIG. 2 depicts a block diagram of an exemplary LGF 200. The LGF 200 includes at least one reference receiver (RR) 202, a DGPS Cabinet 204, and at least one VDB Cabinet 206. The LGF 200 may include additional components not depicted in FIG. 2.

The RR 202 may include a receiver 208, which may obtain information from the satellites 102 using an antenna. The receiver 208 may include multiple channels to simultaneously track signals from the satellites 102. Typically, the receiver 208 includes five to twenty-four tracking channels, but may include more or less depending on its design. Each tracking channel includes a tracking loop, which may include a code tracking loop and a carrier tracking loop. The code tracking loop may operate to keep incoming satellite code in phase with a replica code generated at the receiver 208, while the carrier tracking loop may operate to keep the incoming satellite carrier signal in phase and/or frequency with a replica carrier signal. The RR 202 may also include a power supply and additional components not depicted in FIG. 2.

The DGPS Cabinet 204 may communicate with the RR 202, the ATCU, the VDB Cabinet 206, environmental sensors, and a National Airspace System (NAS) Infrastructure Management System (NIMS). The DGPS Cabinet 204 may include a Maintenance Data Terminal (MDT), a Local Status Panel (LSP), an Input/Output controller, a processor, an auxiliary Input/Output controller, a data recorder, a NIMS proxy, and other operational devices, such as power supplies. The DPGS Cabinet 204 may include additional components not depicted in FIG. 2.

The VDB Cabinet 206 may communicate with the DGPS Cabinet 204 and the aircraft 104. The VDB Cabinet 206 may include a transmitter, a receiver, a multiplexer, a status panel, and a power system. The VDB Cabinet 206 may include additional components not depicted in FIG. 2.

The requirements of the LGF 200 are documented in the FAA released Specification, FAA-E-2937A, for a Category I LGF on Apr. 17, 2002, the contents of which are incorporated by reference. The FAA LGF specification has identified satellite signal deformation, which includes deformation of a correlation peak, as a threat to the LGF that must be handled to ensure accuracy and integrity of the LAAS. Per the FAA LGF specification, the broadcast sigma ($\sigma$) must overbound the distribution of the error in differential corrections at all times. Accordingly, a means to monitor satellite signal deformation is needed to determine whether the LGF 200 meets the performance requirements specified by FAA. U.S. patent application Ser. No. 09/691,690, the entirety of which is incorporated by reference herein, titled, "Apparatus for Navigation Satellite Signal Quality Monitoring," filed Oct. 18, 2000 and naming Mats A. Brenner as inventor, describes a scheme for monitoring satellite signal deformation.

Satellite signal deformations that occur in the front end of one of the receivers 208 (i.e. before digitization) can typically be ignored since these deformations are common to all satellites. However, this front end signal deformation may bias correlation measurements used for monitoring the satellite signal deformation. The scheme for monitoring satellite signal deformation described in U.S. patent application Ser. No. 09/691,690 does not correct for biasing to the correlation measurements caused by front end signal deformation. Accordingly, a method for removing this bias is needed. One way to correct for this bias would be to characterize every individual receiver 208 over the operational temperature range. However, this technique is cumbersome. A more efficient method involving a correlation transformation is described with reference to FIG. 3.

Figure 3:
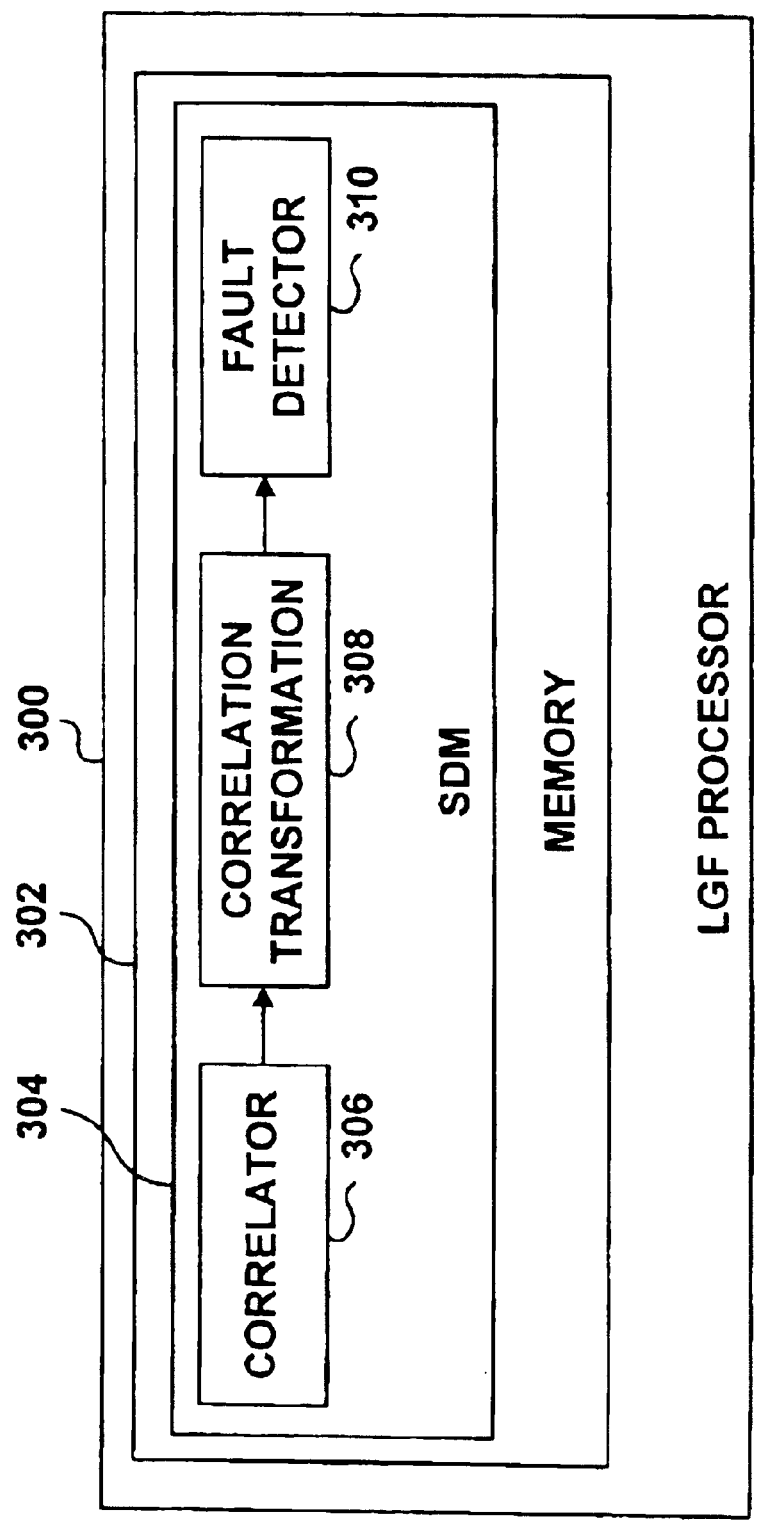
FIG. 3 is a simplified block diagram illustrating a LGF processor 300 according to an exemplary embodiment.

FIG. 3 is a simplified block diagram illustrating a LGF processor 300 according to an exemplary embodiment of the present invention. The LGF processor 300 may, for example, be implemented in the DGPS Cabinet 204 of the LGF 200 shown in FIG. 2.

The LGF processor 300 includes a memory 302 having a signal deformation monitor (SDM) 304 stored thereon. The SDM 304 may, for example, consist of a series of machine instructions operable to assist in monitoring signal deformation. While the memory 302 is shown as being "on-board," (i.e. part of the LGF processor 300) the memory may instead be located in a physically separate location from the LGF processor 300, with a means for connecting the memory and the LGF processor 300. In addition, while the SDM 304 of the exemplary embodiment is a software module, other implementation schemes may alternatively be used, such as a firmware or hardware implementation. The software scheme described herein provides the most flexibility.

The SDM 304 may include a correlator 306, a correlation transformation 308, and a fault detector 310. The correlator 306 may determine a plurality of correlation measurements at points along a correlation curve. The correlation curve is further described with reference to FIG. 4. Each correlation measurement may be based upon a correlation between a received satellite signal and a reference. An exemplary correlator 306 is described in U.S. patent application Ser. No. 09/691,690; however, any combination of hardware, firmware, and software may be used to perform the correlation between the received satellite signal and the reference.

For each correlation measurement, the correlation transformation 308 may subtract the mean of the correlation measurements over all tracked satellites from each of the correlation measurements. The correlation transformation 308 may be performed using any combination of hardware, firmware, and software. Since all selected satellite signals pass through the front end of the same receiver 208, any variations in the front end may be canceled. By canceling out the variations, front end signal deformation may not bias the correlation measurements determined by the correlator 306. Additional details regarding the correlation transformation 308 are described with reference to FIG. 5.

The fault detector 310 may determine the differences between the correlation measurements and the correlation curve and detect signal distortion based on the magnitudes of the differences. Additionally or alternatively, the fault detector 310 may calculate a plurality of differential measurements by determining the difference in value between a pair of correlation measurements. The plurality of differential measurements may then be compared to expected values of the measurements. The expected values are the differential values expected if there was no satellite signal deformation. This comparison may be used to detect signal deformation. An exemplary fault detector 310 is described in U.S. patent application Ser. No. 09/691,690; however, any combination of hardware, firmware, and software operable to determine the differences between the correlation measurements along the correlation curve may be used to detect signal deformation.

Figure 4:
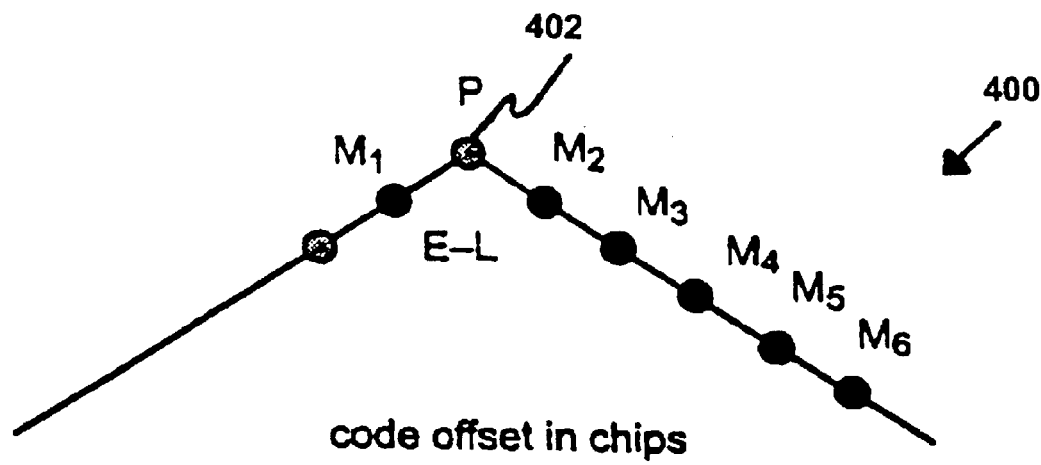
FIG. 4 is a simplified correlation curve 400, according to an exemplary embodiment.

FIG. 4 is a simplified correlation curve 400, according to an exemplary embodiment of the present invention. The correlation curve 400 may be realized by correlating code received from a satellite with a plurality of code references that are time shifted replicas of the code transmitted by the same satellite. The correlator 306 may perform this correlation. The correlation curve 400 illustrates code offset in chips, with a maximum correlation of 1.00 occurring at the correlation peak 402 (point P).

The correlation peak 402 (point P) occurs where a reference code has a zero time shift with respect to the received code. This measurement is referred to as being "punctual." The in-phase measurements (e.g. point $M_1$) to the left of the correlation peak 402 (point P) represent the amount of correlation between the received code and reference codes that have predetermined time shifts that make the reference code early with respect to the received code. These measurements are referred to as being "early." The in-phase measurements (e.g. points $M_2$–$M_6$) to the right of the correlation peak 402 (point P) represent the amount of correlation between the received code and reference codes that have predetermined time shifts that make the reference code late with respect to the received code. These measurements are referred to as being "late."

FIG. 4 shows correlation measurements $f_1$ to $f_K$ taken at $M_1$ to $M_K$ along the correlation curve 400 for the case when K=6. The correlation measurements of FIG. 4 may be obtained when Doppler is tracked (i.e. quadrature measurements are driven to zero). The internal code replicas may be positioned at different offsets $\tau_n$ to $\tau_K$ relative to the received signal code. According to one implementation, the resulting in-phase measurements are averaged over an interval T and are low-pass filtered. Other implementations may also be used. Based on the measurements $f_1$ to $f_K$ taken at $M_1$ to $M_K$ along the correlation peak, the fault detector 310 within SDM 304 determines whether the signal deformation threshold has been reached.

Figure 5:
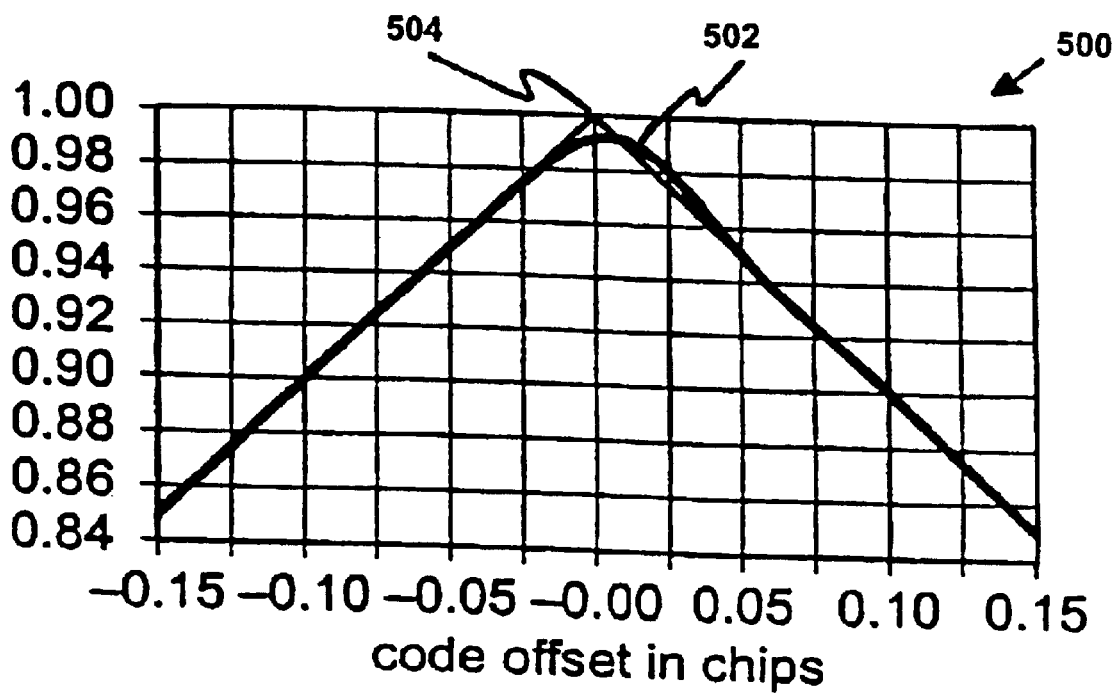
FIG. 5 is a correlation diagram illustrating a typical front-end deformation of the correlation peak.

FIG. 5 is a correlation diagram 500 illustrating a typical front end deformation 502 of the correlation peak 504. The front end correlation peak deformation may be the same for all received satellite signals. Therefore, it may be possible to define a correlation measurement $\hat{f}_k$ that is independent of this common deformation. The front end independent correlation measurement $\hat{f}_k$ may be defined as:

$$\hat{f}_k = f_k[m, n] - \frac{1}{(N-1)} \sum_{i=1, i \neq n}^{N} f_k[m, i] \qquad \text{(Equation 1)}$$

where N is the number of selected satellites (N>1) and m is the ground receiver index. As seen in Equation 1, the front end independent correlation measurement may be calculated by subtracting the mean over all selected satellites from each of the correlation measurements. The correlation transformation 308 in the SDM 304 may perform this calculation.

The fault detector 310 in the SDM 304 may calculate a plurality of differential measurements by determining the difference in value between a pair of correlation measurements. The plurality of differential measurements may then be compared to expected values of these measurements. This comparison may be used to detect signal deformation. The differential measurements as defined in the U.S. patent application Ser. No. 09/691,690 are:

$$e_k[m,n] = f_{k+1}[m,n] - f_k[m,n] \qquad \text{(Equation 2)}$$

In order to correct for biasing caused by the front end signal deformations, the differential measurements for satellite n in receiver m may now be defined as:

$$\hat{e}_k[m,n] = \hat{f}_{k+1}[m,n] - \hat{f}_k[m,n] \qquad \text{(Equation 3)}$$

By incorporating Equation 3 into Equation 1, the differential measurements may now be defined as follows.

$$\hat{e}_k[m, n] = e_k[m, n] - \frac{1}{(N-1)} \sum_{i=1, i \neq n}^{N} e_k[m, i] \qquad \text{(Equation 4)}$$

Thus, pursuant to this exemplary embodiment, both the correlation measurements and the differential measurements are converted to front end independent entities based on the same algorithm.

The standard deviation (1-sigma) of both the correlation measurement and the differential measurement may be defined as a and may be calculated from the relation:

$$\sigma^2 = \sigma_k[m, n]^2 + \frac{1}{(N-1)^2} \sum_{i=1, i \neq n}^{N} \sigma_k[m, i]^2 \qquad \text{(Equation 5)}$$

where $\sigma_k[m,n]$ are the original sigmas. Assuming, for example, at least 4 satellites and sigmas of the same magnitude, the 1-sigma reduces to the following:

$$\sigma^2 < 4\sigma_k[m,n]^2/3 \qquad \text{(Equation 6)}$$

In some cases, a satellite with a favorable signal-to-noise ratio relative to other satellites may be degraded more than this, but the advantage of removing a bias that is about 3 times the 1-sigma performance is likely to outweigh this drawback for most applications. If a satellite is degraded so that its presence is unfavorable, it may be deselected as the conversion is performed. Accurate results may be obtained if all noise-induced biases are removed before these new measurements are formed.

The transformed correlation and differential measurements may be used to form SDM monitor discriminators that optimize the visibility of the signal deformations that pose a threat and must be detected. U.S. patent application Ser. No. 09/691,690, sets forth methods and apparatus for forming these discriminators and provides additional details on correlation and signal distortion detection. Using concepts taught in the present application and in U.S. patent application Ser. No. 09/691,690, a reliable signal deformation monitor may be constructed that is independent of deformations occurring at the receiver front end.

It should be understood that the illustrated embodiments are exemplary only and should not be taken as limiting the scope of the present invention. While the invention has been described with reference to receivers in the LGF, the invention may be applicable to any system utilizing signals from a satellite-based positioning system that requires monitoring of signal deformation. Likewise, while the invention has been described with reference to an aircraft, the invention may be applicable to other vehicles or devices, such as space vehicles, missiles, and pipeline inspection gear. The claims should not be read as limited to the described order or element unless stated to that effect. Therefore, all embodiments that come within the scope and spirit of the following claims and equivalents thereto are claimed as the invention.

I claim:

1. A system for monitoring satellite signal deformation, comprising in combination:
   a correlator operable to determine a plurality of correlation measurements for each of a plurality of satellites at points along a correlation curve, wherein each correlation measurement is based upon a correlation between a received satellite signal and a reference;
   a correlation transformation operable to subtract a mean of the correlation measurements over the plurality of satellites from each of the plurality of correlation measurements, whereby bias from front end signal deformation is removed from the plurality of correlation measurements; and
   a fault detector operable to determine a discriminator based on a plurality of differences between the plurality of correlation measurements and the correlation curve and to detect signal deformation based on a magnitude of the discriminator.

2. The system of claim 1, wherein the plurality of correlation measurements is calculated according to the following equation:

$$\hat{f}_k = f_k[m, n] - \frac{1}{(N-1)} \sum_{i=1, i \neq n}^{N} f_k[m, i].$$

3. The system of claim 2, wherein the standard deviation of the plurality of correlation measurements is calculated according to the following equation:

$$\sigma^2 = \sigma_k[m, n]^2 + \frac{1}{(N-1)^2} \sum_{i=1, i \neq n}^{N} \sigma_k[m, i]^2.$$

4. The system of claim 1, wherein the fault detector is operable to calculate a differential measurement by determining a difference between a pair of correlation measurements.

5. The system of claim 4, wherein the differential measurement is calculated according to the following equation:

$$\hat{e}_k[m, n] = e_k[m, n] - \frac{1}{(N-1)} \sum_{i=1, i \neq n}^{N} e_k[m, i].$$

6. The system of claim 5, wherein the standard deviation of the differential measurement is calculated according to the following equation:

$$\sigma^2 = \sigma_k[m, n]^2 + \frac{1}{(N-1)^2} \sum_{i=1, i \neq n}^{N} \sigma_k[m, i]^2.$$

7. A method of monitoring satellite signal deformations that is independent of deformations occurring at a front end of a receiver, comprising in combination:
   correlating a received satellite signal with a reference signal in order to determine a plurality of correlation measurements at points along a correlation curve;
   transforming the plurality of correlation measurements by subtracting a mean of the correlation measurements over a plurality of satellites from each of the correlation measurements;
   determining a plurality of differences between the transformed correlation measurements and the correlation curve; and
   detecting signal deformation based on magnitudes of the plurality of differences between the transformed correlation measurements and the correlation curve.

8. The method of claim 7, wherein transforming the plurality of correlation measurements is performed using the following equation:

$$\hat{f}_k = f_k[m, n] - \frac{1}{(N-1)} \sum_{i=1, i \neq n}^{N} f_k[m, i].$$

9. The method of claim 8, wherein the standard deviation of the plurality of correlation measurements is calculated according to the following equation:

$$\sigma^2 = \sigma_k[m, n]^2 + \frac{1}{(N-1)^2} \sum_{i=1, i \neq n}^{N} \sigma_k[m, i]^2.$$

10. The method of claim 7, further comprising calculating a differential measurement by taking a difference between a pair of correlation measurements.

11. The method of claim 10, wherein calculating the differential measurement is performed according to the following equation:

$$\hat{e}_k[m, n] = e_k[m, n] - \frac{1}{(N-1)} \sum_{i=1, i \neq n}^{N} e_k[m, i].$$

12. The method of claim 11, wherein the standard deviation of the differential measurement is calculated according to the following equation:

$$\sigma^2 = \sigma_k[m, n]^2 + \frac{1}{(N-1)^2} \sum_{i=1, i \neq n}^{N} \sigma_k[m, i]^2.$$

13. A satellite signal deformation monitoring system, comprising in combination:
   a processor;
   memory; and
   machine language instructions stored in the memory executable by the processor to:
      correlate a received satellite signal with a reference signal in order to determine a plurality of correlation measurements at points along a correlation curve;
      transform the plurality of correlation measurements by subtracting a mean of the correlation measurements over a plurality of satellites from each of the correlation measurements;
      determine a plurality of differences between the transformed correlation measurements and the correlation curve; and
      detect signal deformation based on magnitudes of the plurality of differences between the transformed correlation measurements and the correlation curve.

* * * * *

UNITED STATES PATENT AND TRADEMARK OFFICE
CERTIFICATE OF CORRECTION

| | | |
|---|---|---|
| PATENT NO. | : 6,809,684 B2 | Page 1 of 1 |
| APPLICATION NO. | : 10/667854 | |
| DATED | : October 26, 2004 | |
| INVENTOR(S) | : Mats A Brenner | |

It is certified that error appears in the above-identified patent and that said Letters Patent is hereby corrected as shown below:

In the Description, column 6, line 27, please replace "as a and" with --as σ and--.

Signed and Sealed this

Twenty-first Day of August, 2007

JON W. DUDAS
*Director of the United States Patent and Trademark Office*